US012064786B2

(12) United States Patent
Bamford

(10) Patent No.: US 12,064,786 B2
(45) Date of Patent: *Aug. 20, 2024

(54) COATING APPARATUS

(71) Applicant: Automatic Coating Limited, Toronto (CA)

(72) Inventor: Brad Bamford, Scarborough (CA)

(73) Assignee: Automatic Coating Limited, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/934,211

(22) Filed: Sep. 22, 2022

(65) Prior Publication Data

US 2023/0013140 A1 Jan. 19, 2023

Related U.S. Application Data

(63) Continuation of application No. 16/922,462, filed on Jul. 7, 2020, now Pat. No. 11,491,506, which is a (Continued)

(51) Int. Cl.
*B05C 3/04* (2006.01)
*B05C 3/10* (2006.01)
(Continued)

(52) U.S. Cl.
CPC .................. *B05C 3/04* (2013.01); *B05C 3/10* (2013.01); *B05C 13/02* (2013.01); *B05C 19/02* (2013.01); *B05D 1/22* (2013.01); *B05B 5/082* (2013.01); *B05B 13/0235* (2013.01); *B05B 14/10* (2018.02); *B05C 11/06* (2013.01)

(58) Field of Classification Search
USPC ..... 118/66, 309, 326, 305, 62, 63, 500, 313, 118/315, 303
See application file for complete search history.

(56) References Cited

U.S. PATENT DOCUMENTS

| | | | |
|---|---|---|---|
| 733,831 | A | 7/1903 | First |
| 1,109,314 | A | 9/1914 | Beausejour |

(Continued)

OTHER PUBLICATIONS

International Search Report Issued in corresponding PCT Application No. PCT/CA2018/050982; search completed Nov. 9, 2018.

*Primary Examiner* — Yewebdar T Tadesse
(74) *Attorney, Agent, or Firm* — Laurie Wright; Christopher N. Hunter; Blake, Cassels & Graydon LLP

(57) ABSTRACT

A transfer and coating apparatus transfers a component from a conveyor to a coating station for application of a coating. The transfer apparatus includes a mast that can move about orthogonal axes in a horizontal plane and a mast having a carriage that can move vertically. The carriage includes a hook that swings about a horizontal axis relative to the mast for movement of the component in the horizontal direction. A sway bar extends between the hook and component to inhibit movement about a horizontal axis. The component is delivered to an upper compartment of a coating apparatus where it can be lowered in to a lower compartment containing coating material. Excess coating material is removed by an array of nozzles in the upper compartment as the component is raised from the coating material.

7 Claims, 20 Drawing Sheets

Related U.S. Application Data continuation of application No. 16/103,055, filed on Aug. 14, 2018, now Pat. No. 10,730,068.

(60) Provisional application No. 62/545,566, filed on Aug. 15, 2017.

(51) Int. Cl.

| | |
|---|---|
| ***B05C 13/02*** | (2006.01) |
| ***B05C 19/02*** | (2006.01) |
| ***B05D 1/22*** | (2006.01) |
| *B05B 5/08* | (2006.01) |
| *B05B 13/02* | (2006.01) |
| *B05B 14/10* | (2018.01) |
| *B05C 11/06* | (2006.01) |

(56) References Cited

U.S. PATENT DOCUMENTS

| | | | | |
|---|---|---|---|---|
| 2,491,015 | A | 12/1949 | Brereton | |
| 3,058,604 | A | 10/1962 | Harper | |
| 3,248,253 | A | 4/1966 | Barford et al. | |
| 3,262,420 | A | 7/1966 | Bossi | |
| 3,507,251 | A | 4/1970 | Thayer et al. | |
| 3,861,352 | A | 1/1975 | Hammer | |
| 3,998,346 | A | 12/1976 | Gibson | |
| 4,013,807 | A | 3/1977 | Putney et al. | |
| 4,397,893 | A | 6/1983 | Bottoms | |
| 4,439,102 | A | 3/1984 | Allen | |
| 4,609,093 | A | 9/1986 | Taketani | |
| 4,930,213 | A | 6/1990 | Hayakawa et al. | |
| 5,069,598 | A | 12/1991 | Kleinhen et al. | |
| 5,137,689 | A | 8/1992 | Cantrell | |
| 5,203,811 | A | 4/1993 | Hirotani | |
| 5,231,726 | A | 8/1993 | McKenney et al. | |
| 6,280,798 | B1 | 8/2001 | Ring et al. | |
| 6,342,146 | B1 | 1/2002 | Velasquez | |
| 6,444,032 | B1 | 9/2002 | Bamford | |
| 9,802,218 | B2 | 10/2017 | Bamford | |
| 11,491,506 | B2 * | 11/2022 | Bamford | B05D 1/22 |
| 2005/0287306 | A1 * | 12/2005 | Hays | B05B 5/081 427/458 |
| 2010/0236896 | A1 | 9/2010 | Miura et al. | |
| 2011/0091655 | A1 * | 4/2011 | Parling | A43D 11/003 427/421.1 |
| 2015/0321218 | A1 | 11/2015 | Bamford | |

* cited by examiner

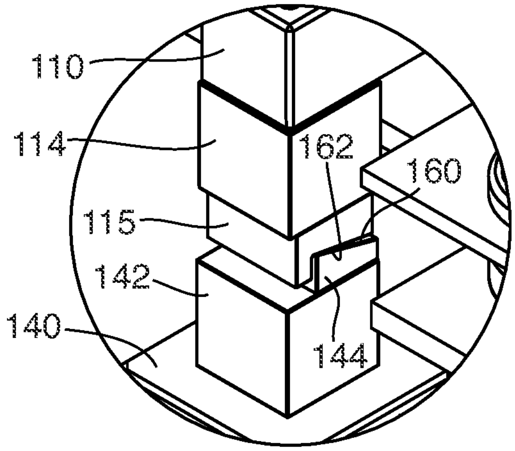
Fig. 10
Fig. 11
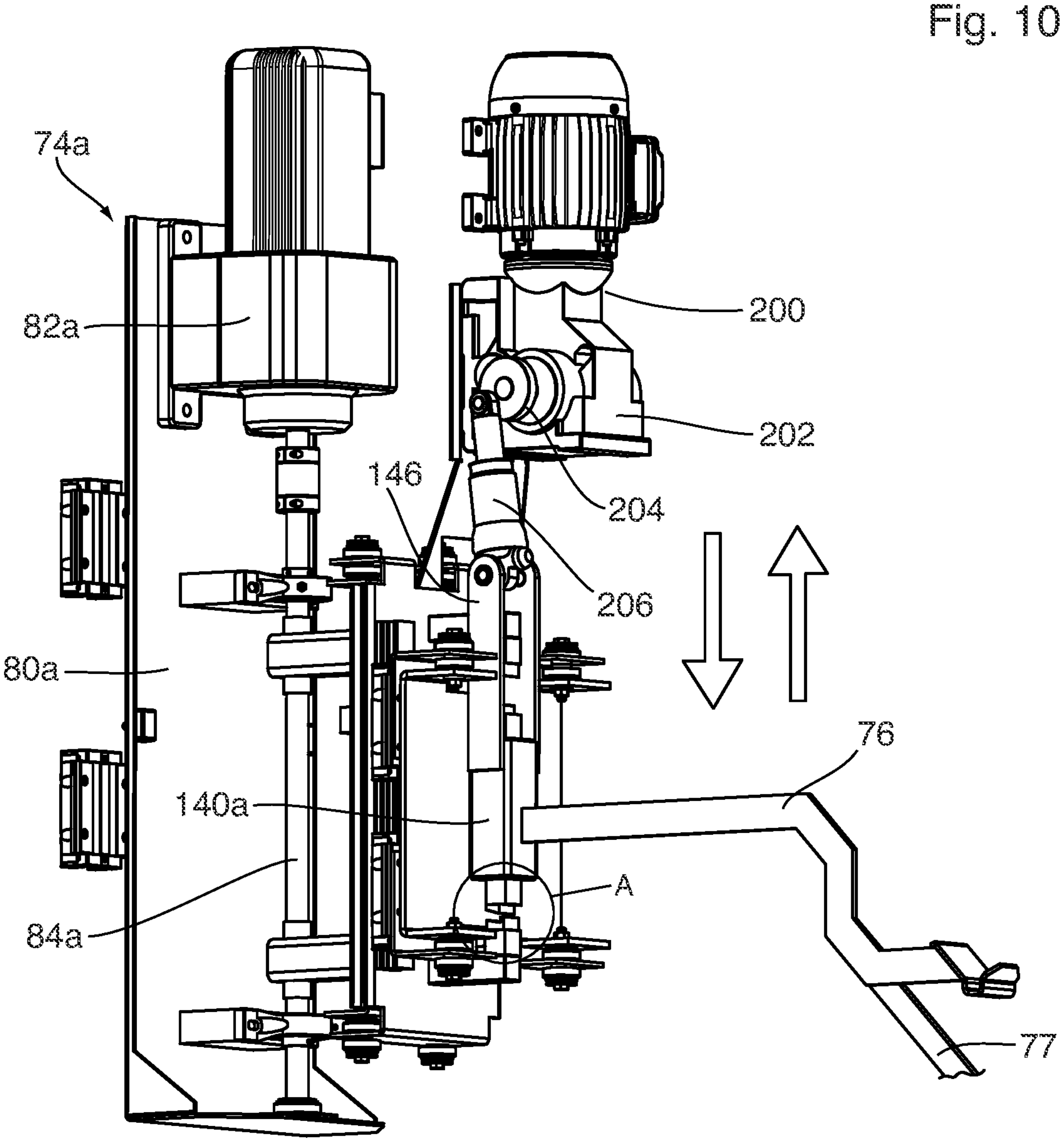

COATING APPARATUS

CROSS-REFERENCE TO RELATED APPLICATIONS

This application is a continuation of U.S. application Ser. No. 16/922,462 filed on Jul. 7, 2020, which is a continuation of U.S. application Ser. No. 16/103,055 filed on Aug. 14, 2018, which claims priority to U.S. Provisional Patent Application No. 62/545,566 filed on Aug. 15, 2017, all of which are incorporated herein by reference in their entireties.

FIELD OF THE INVENTION

The present invention relates to a method and apparatus for applying a coating to a component.

SUMMARY OF THE INVENTION

Most fabricated articles require a coating to be applied to protect them against the environment in which they will operate. One of the most demanding environments is salt water, as encountered on seagoing vessels, in which mechanisms and components must be protected again the corrosive effects of the salt carried in the sea water. The maintenance of the components is an expensive and continuous process. Painting or coating of components is performed prior to exposure, but even then frequent replacement of intricate components where salt water may be trapped is necessary.

One particular application that has proven difficult to properly maintain is the sealing systems found on watertight doors used on seagoing vessels. The seals are contained within a channel formed from a lip of the door and a weldment to contain the seal. This construction provides various crevices in which protective coatings are difficult to apply and in which seawater tends to collect in use leading to rapid corrosion of the seal system and failure of the door.

It is known to apply coatings through the use of fluidized beds to components as shown for example in U.S. Pat. No. 6,444,032. The coating of a door assembly with a seal retention system does however pose further challenges, in particular because of the intricate nature of the seal retention system.

To ensure a uniform and penetrating coating to a component, such as a door, it has been found effective to agitate the component within the fluidised bed as the component is immersed and retracted. U.S. Pat. No. 9,802,218 describes a method and apparatus in which a component is supported on a hook as it is lowered in to a fluidised bed. A drive acts on the hook to cause bodily movement of the component within the fluidised bed with abrupt reversals in direction. The agitation produced is effective to inhibit bridging of the coating to ensure proper penetration.

In the above disclosure, the hook is mounted on a carriage that is moveable vertically along a mast. The mast is supported on an overhead conveyor for movement in a horizontal plane and can rotate about a vertical axis to adjust the position of the hook. The agitation is provided directly from an air cylinder that is controlled by a valve that effects the abrupt changes in direction. This arrangement has proven highly effective in providing a penetrating coating to a complex surface but requires significant intervention during transfer to control movement of the component and also imposes significant loading on the support for the mast. Moreover, removal of excess coating requires a separate processing station which adds to the complexity and footprint of the apparatus. There is therefore a need to provide increased flexibility and control during the coating process to accommodate different configurations of coating installation and components being coated.

OBJECT OF THE INVENTION

It is therefore an object of the present invention to obviate or mitigate the disadvantages found in prior systems.

SUMMARY OF THE INVENTION

According to the present invention there is provided a method of applying a coating to a component which comprises steps of positioning said component adjacent to a fluidized bed, immersing the component into the fluidized bed to apply a coating thereto, moving the component within the fluidized bed during application of the coating, removing the component from the fluidized bed.

BRIEF DESCRIPTION OF THE DRAWINGS

Embodiments of the invention will now be described by way of example only with reference to the accompanying drawings in which

FIG. 10 is an enlarged view of the portion of the apparatus within circle B in FIG. 9;

FIG. 11 is a perspective view similar to FIG. 6 of an alternative embodiment of carriage;

DETAILED DESCRIPTION OF THE DRAWINGS

Figure 1:
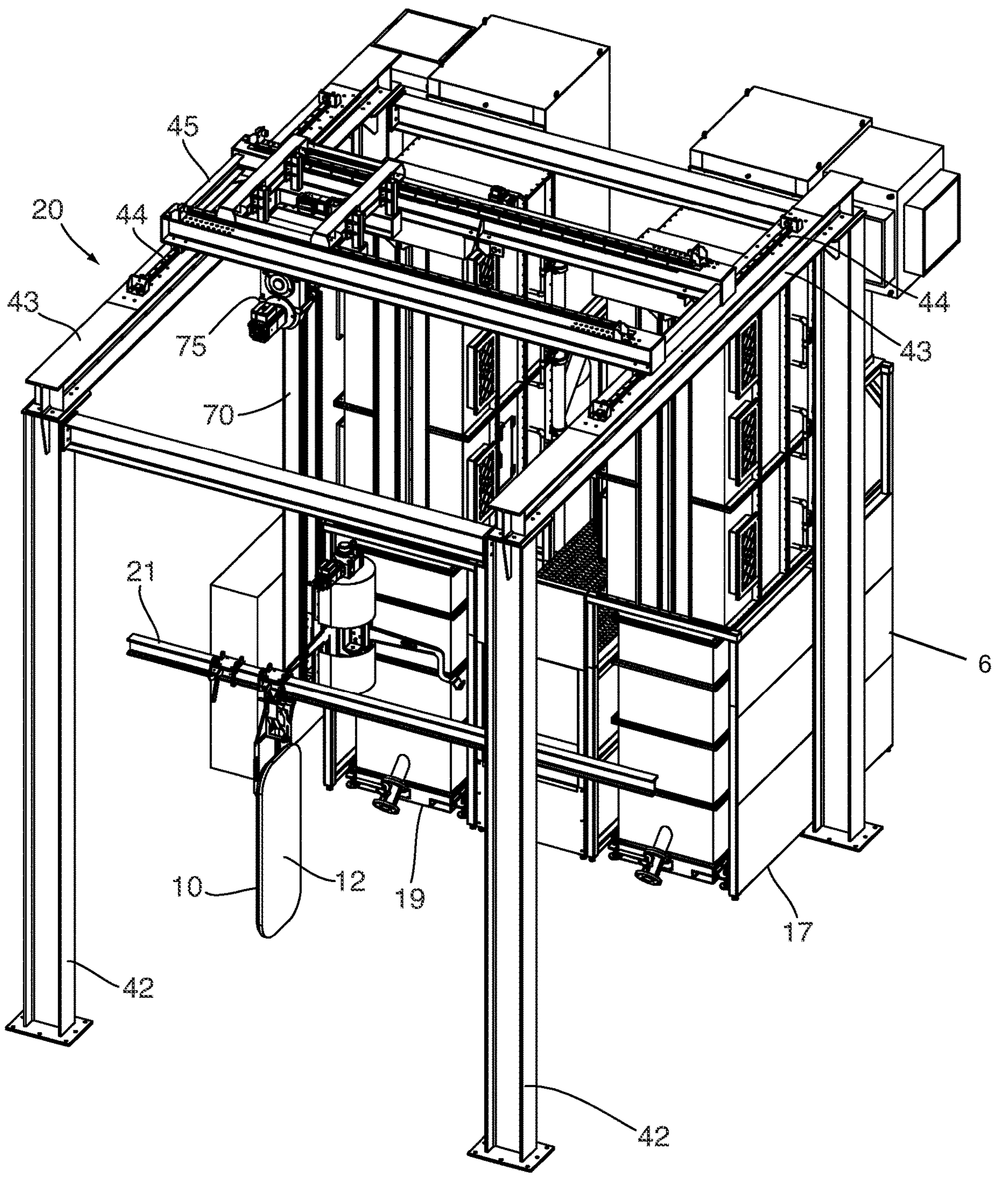
FIG. 1 is a front perspective view of a transfer and coating apparatus for coating a component.
Figure 2:
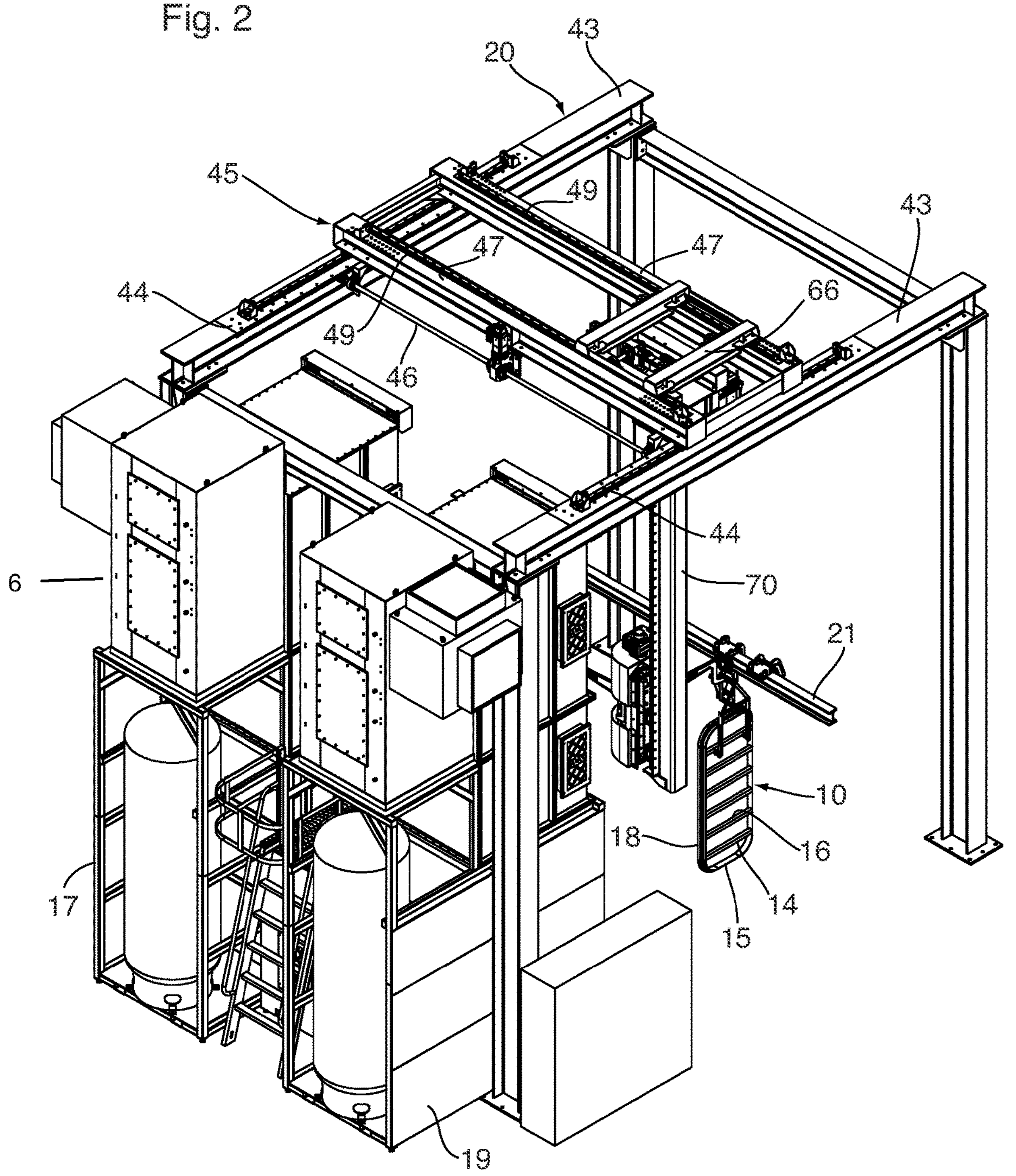
FIG. 2 is a rear perspective view of a transfer and coating apparatus shown in FIG. 1.

Referring firstly to FIGS. 1 and 2, a transfer and coating apparatus generally indicated 2 includes a transfer apparatus 4 and a coating apparatus 6 that are utilised to move a component 10 from a conveyor 21 and apply a coating to the component.

The component 10 that is to be coated is exemplified as a door having an outer surface 12, and a frame 14. The frame 14 has a peripheral frame member 15 and a cross members 16. As shown in greater detail in U.S. Pat. No. 9,802,218, the contents of which are incorporated herein by reference, a seal retainer 18 that carries a seal assembly is incorporated in to the frame 14. The seal retainer 18 is formed as a channel in which a seal sits and has an overturned lip and a flange welded to the frame 14 to define the channel. The channel is of convoluted configuration and is therefore difficult to coat in a manner that fills the voids between the retainer 18 and the frame 14. It will be appreciated that the door is merely exemplary of the components that may be coated and is itself of known construction.

A coating is applied to the component 10 in the coating apparatus 6 which in the embodiment of FIG. 1 includes a pair of fluidised beds 17, 19, each of which contains a coating. To perform a coating process on the component 10, the component 10 is manipulated between the conveyor 21 and the beds 17, 19 by the transfer apparatus that includes an overhead gantry indicated at 20. In the arrangement shown in FIGS. 1 and 2, a pair of fluidised beds 17, 19 are arranged side by side and the component 10 is immersed sequentially in the beds 17, 19. This is merely exemplary of a typical process and it will be appreciated that only a single fluidised bed 17 may be used or that alternative processing apparatus such as an electrostatic coating process may be used rather than the second fluidised bed 19.

The components 10 are delivered to the gantry 20 on the overhead conveyor 21. Prior to delivery to the gantry 20, the component may be moved on the conveyor 21 through various ancillary stations, such as a degreaser, shot blaster and oven to prepare the component 10 for coating. Following coating, the component 10 may be returned to the conveyor 21 for transfer to another area for further processing, such as passing through a curing oven.

Figure 4:
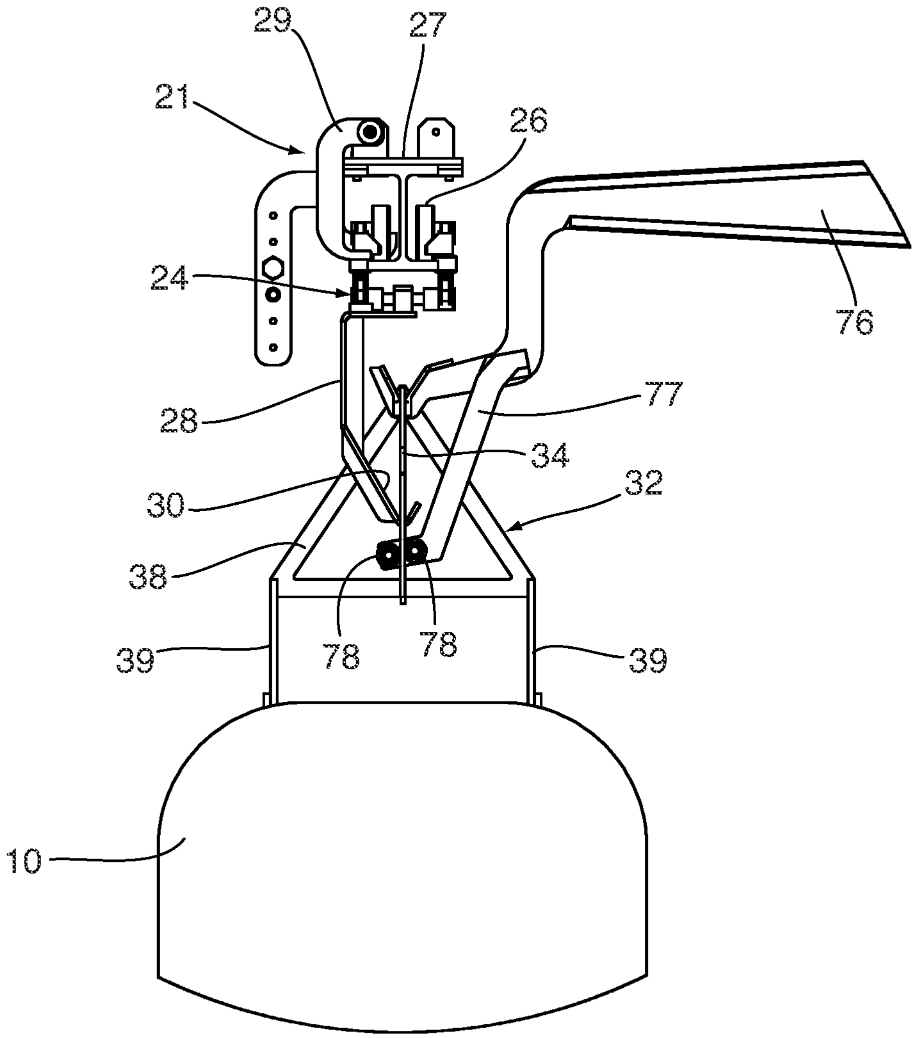
FIG. 4 an enlarged view of a portion of the apparatus within the circle C in FIG. 3.
Figure 5:
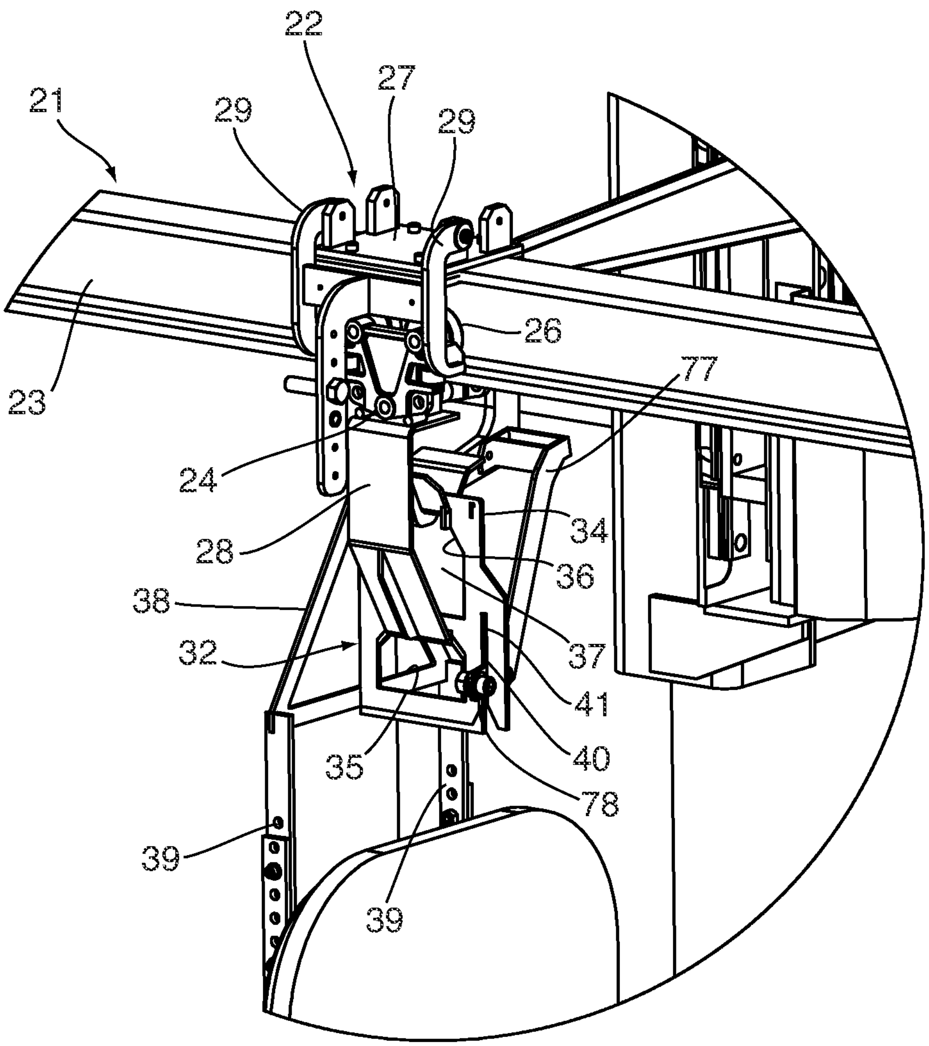
FIG. 5 is a front perspective view of the portion of the apparatus shown in FIG. 4.
Figure 6:
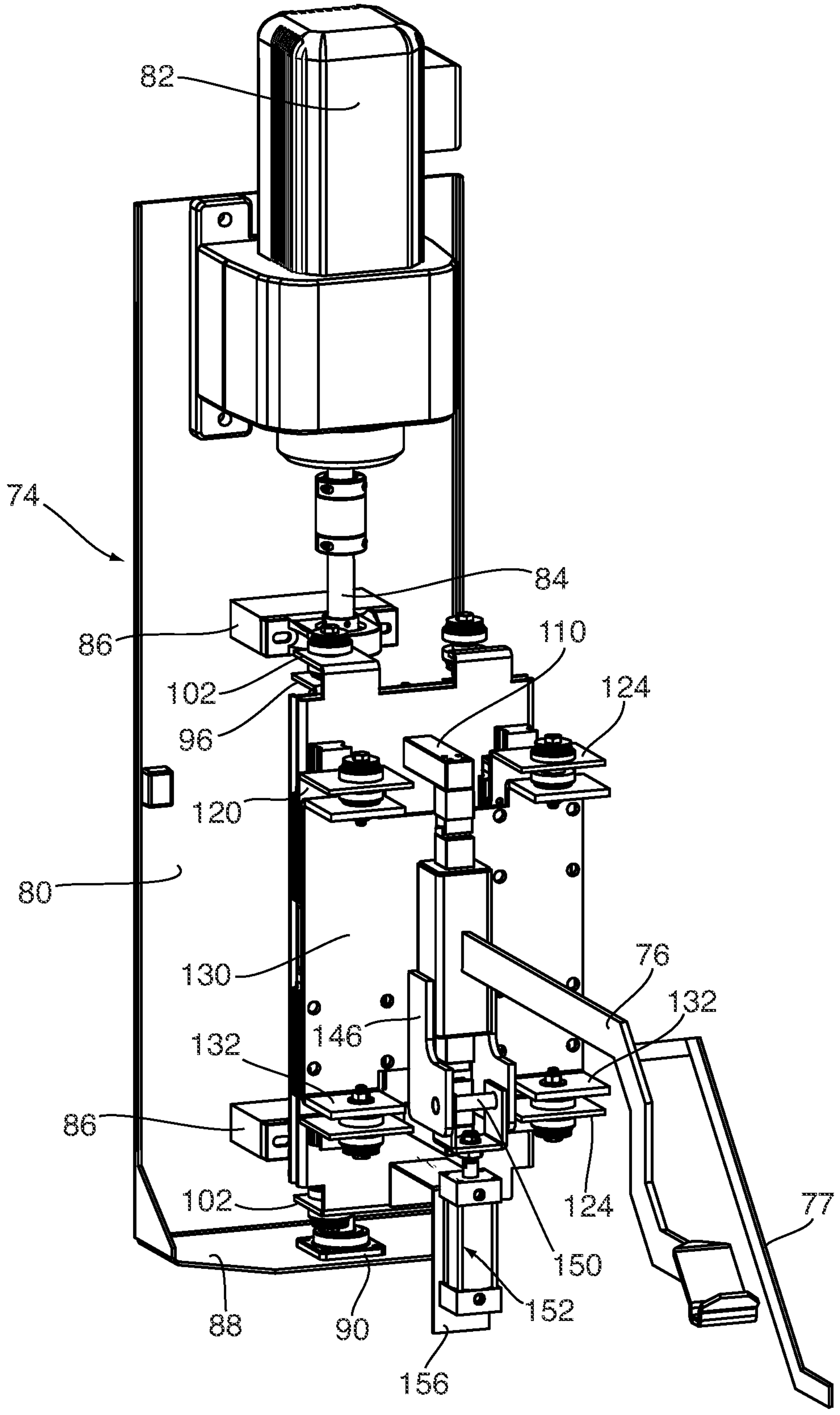
FIG. 6 is a front perspective view of a first embodiment a carriage incorporated in to the apparatus of FIG. 1.
Figure 7:
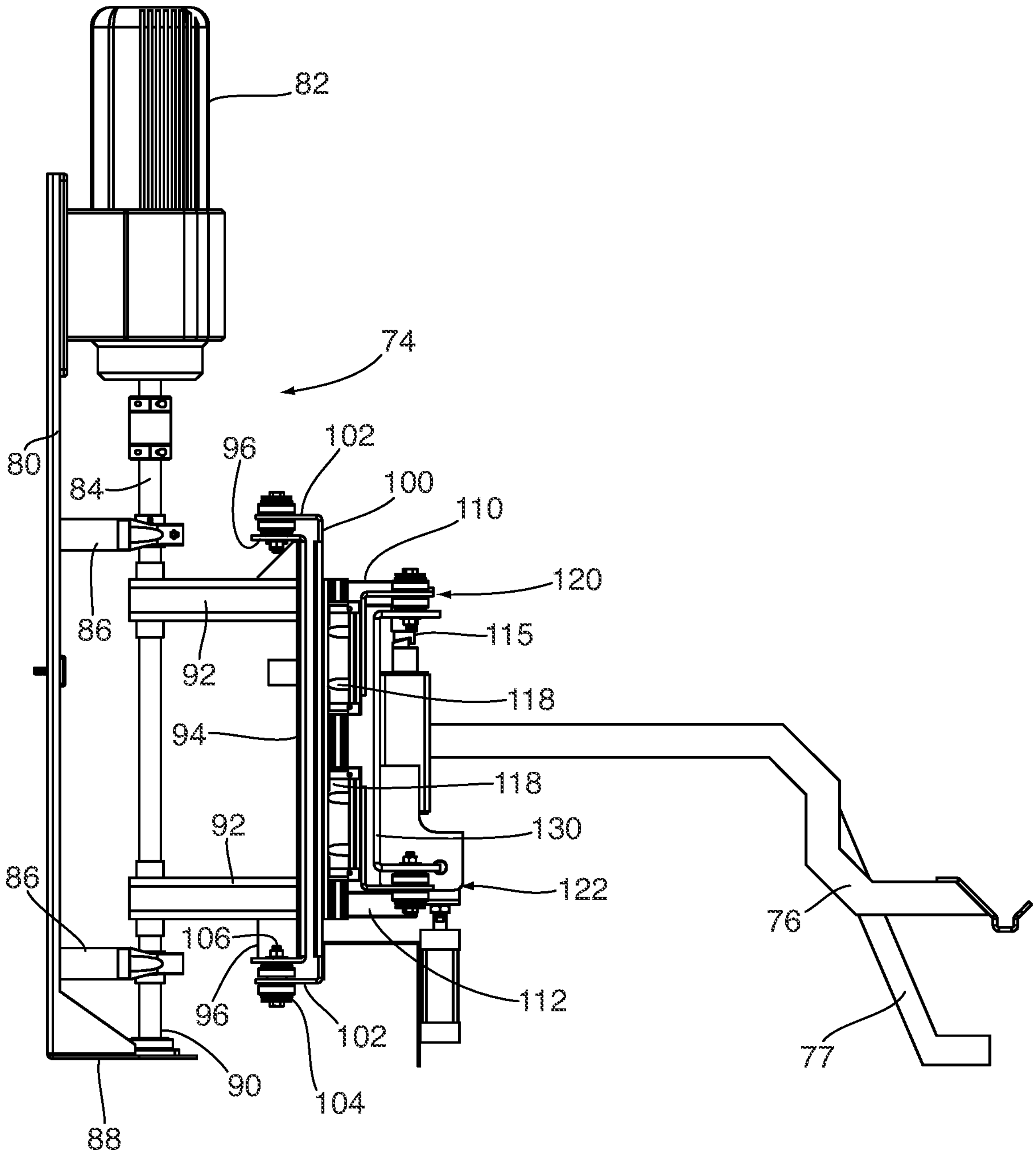
FIG. 7 is a side view of the carriage shown in FIG. 6.
Figure 8:
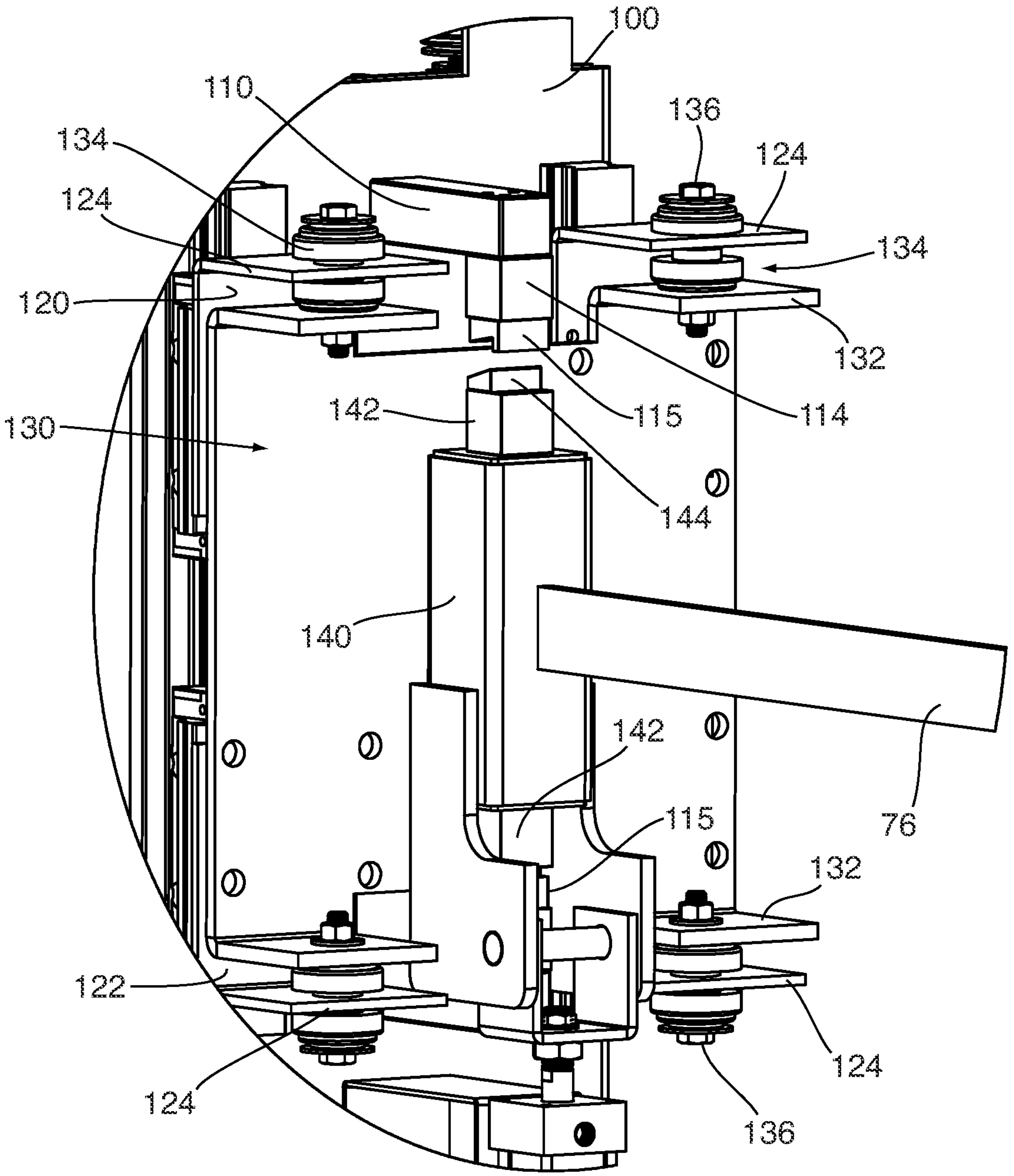
FIG. 8 is a perspective view on an enlarged scale of a portion of the carriage of FIG. 6 in an alternative position.
Figure 9:
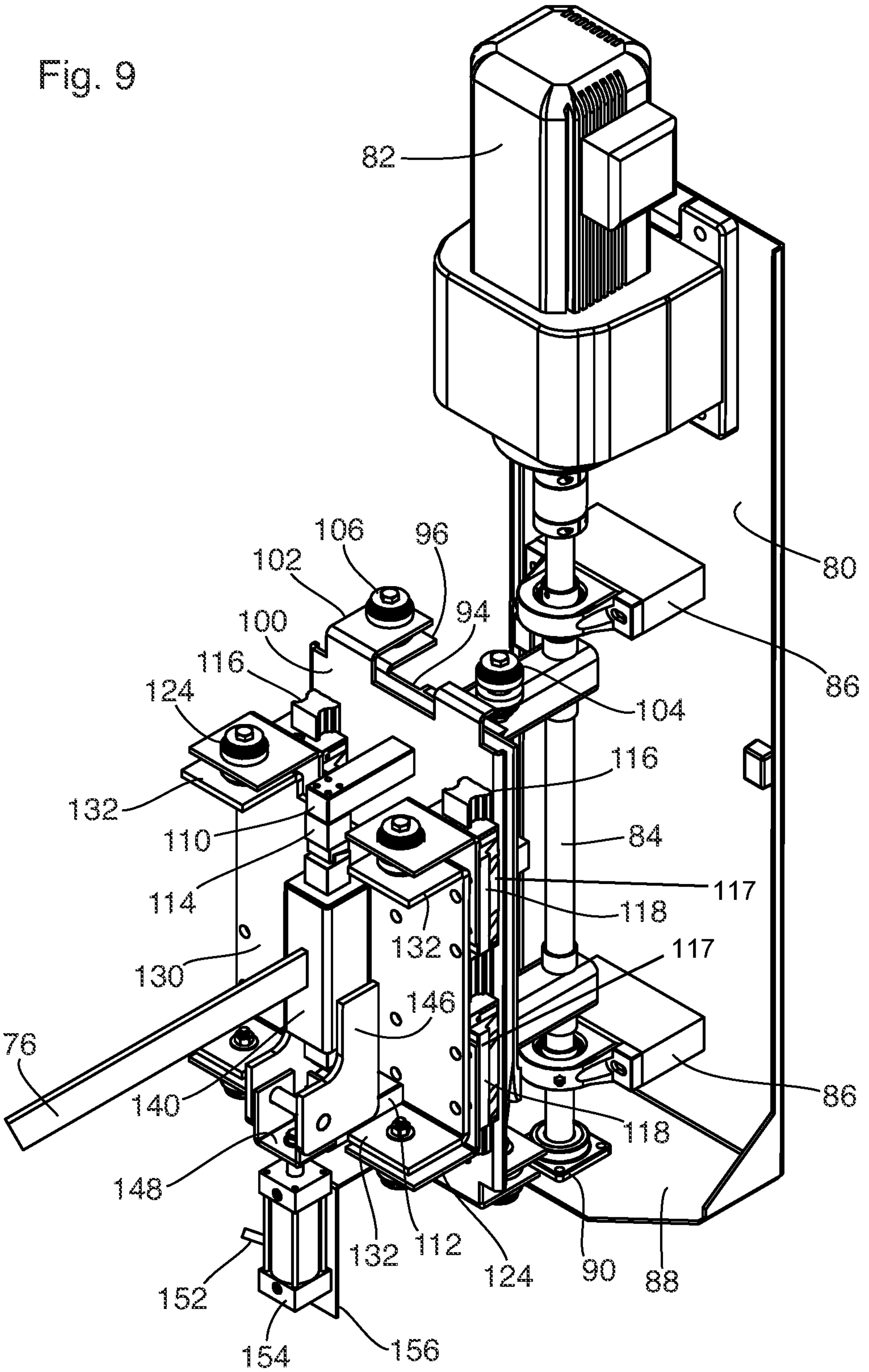
FIG. 9 is a top perspective view of the carriage of FIG. 6.
Figure 12:
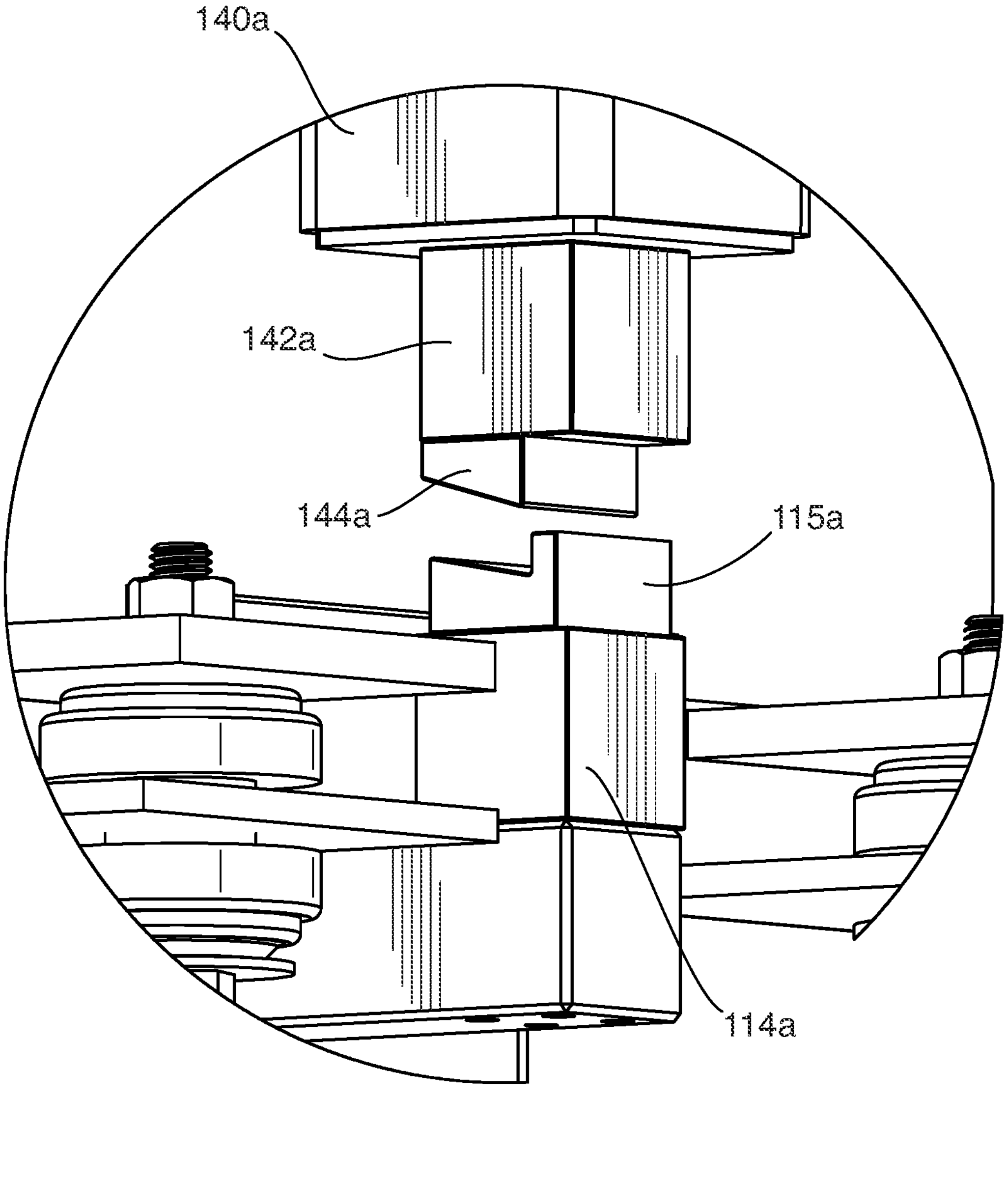
FIG. 12 is an enlarged view of the portion of the apparatus of FIG. 10 within the circle A.
Figure 13:
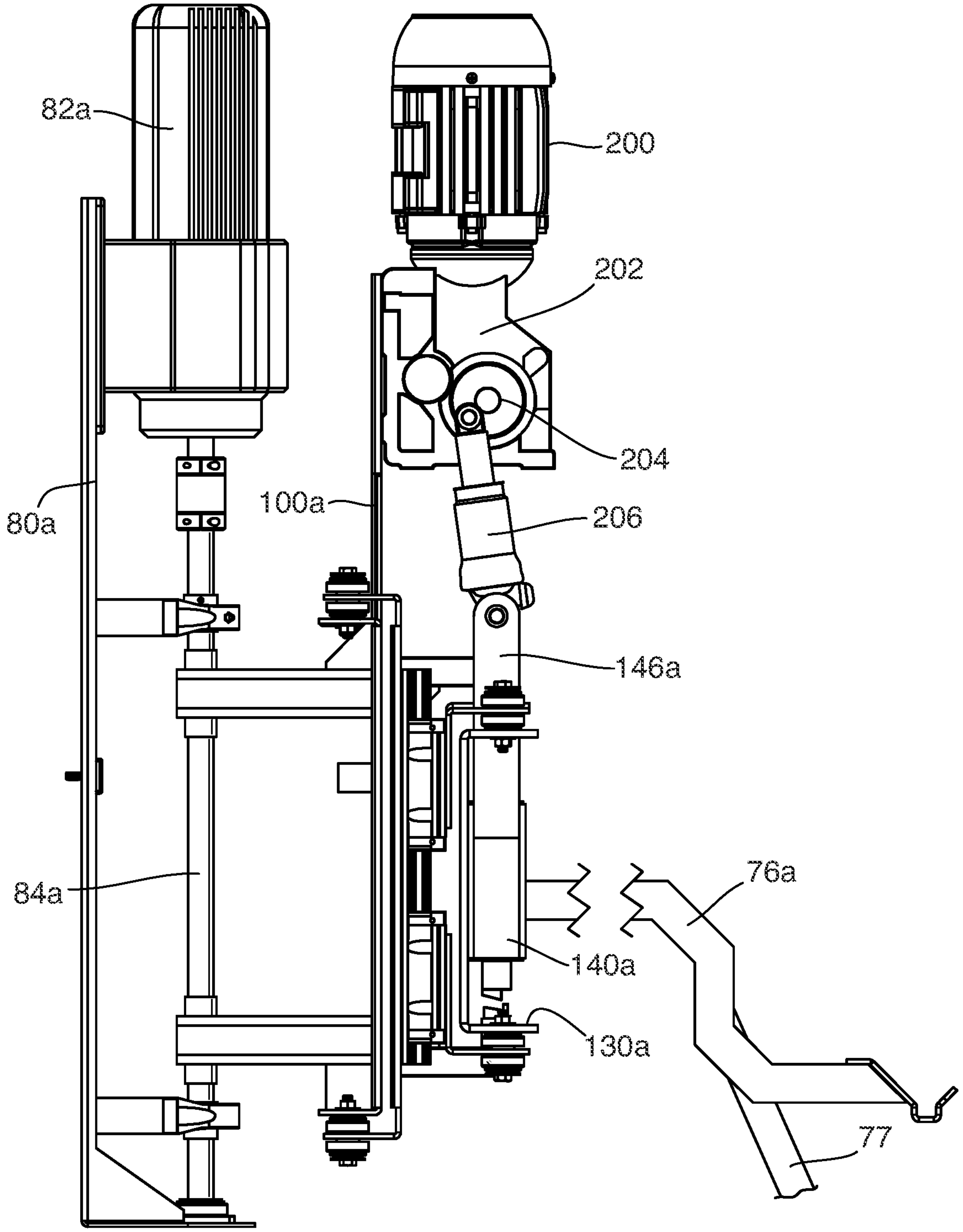
FIG. 13 is a side view of the carriage of FIG. 11.
Figure 14:
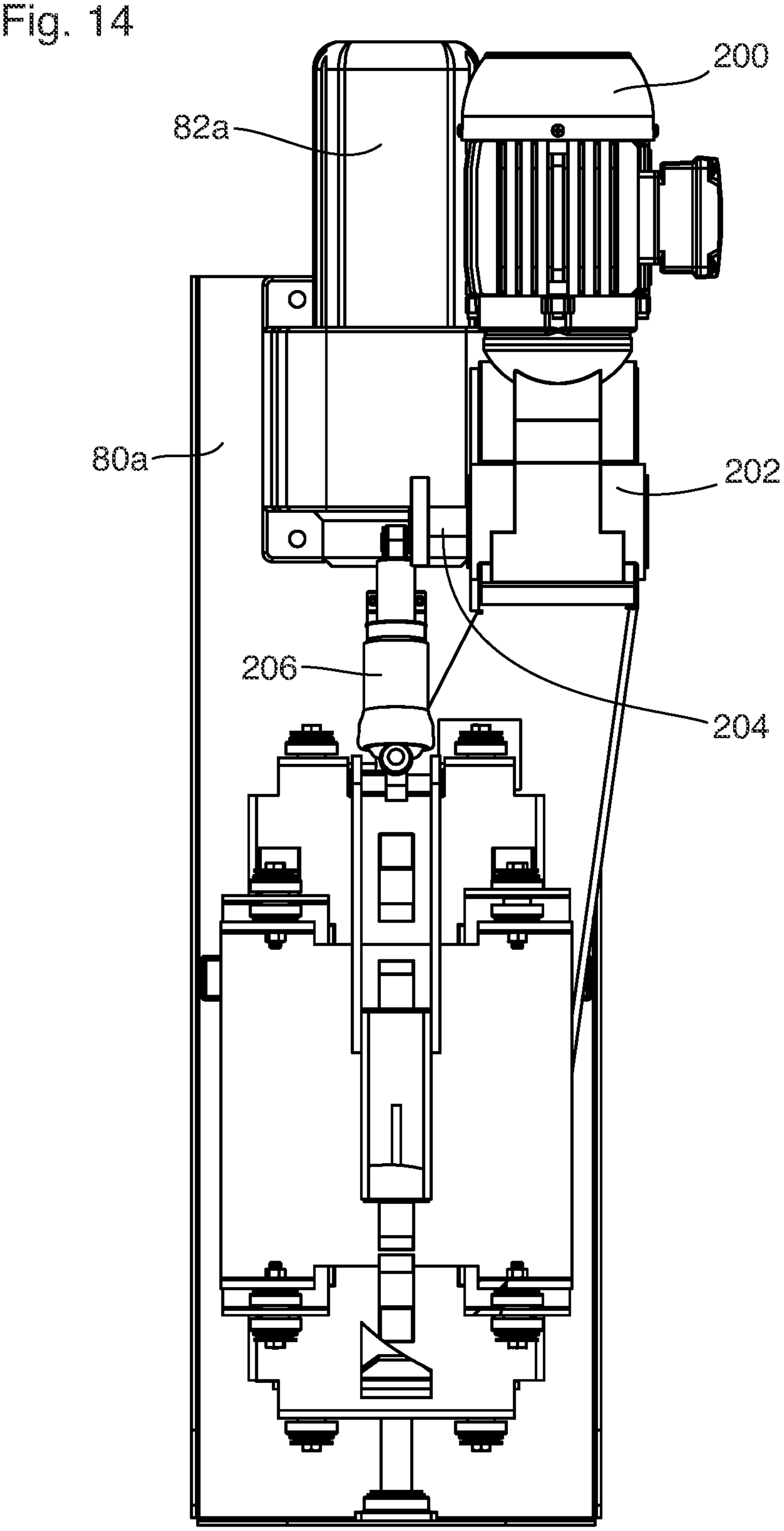
FIG. 14 is a front elevation of the carriage of FIG. 11.

As can be seen in FIGS. 4 and 5, the conveyor 21 is a formed as an I-beam 23 with hanger assemblies 22 that allow components to be suspended from the conveyor 21. The hanger assemblies 22 have a body 24 with rollers 26 that roll along the flanges of the I-beam. The body 24 is held captive on the I-beam 23 by a plate 27 and pivoted clamp arms 29 that engage the body 24 and encompass the I-beam 23. An arm 28 depends from one side of the body 24 and extends under the I-beam 23 to terminate in an upturned V-shaped notch 30.

The component 10 is supported on the conveyor 21 by a hanger 32 that rests on the V-shaped notch 30 of the arm 28. The hanger 32 has a head 34 with a pair of apertures 35, 36 on either side of a cross bar 37. A triangular frame 38 is secured to one edge of the head 34 and extends to opposite sides. A pair of straps 39 with hooked ends depend from the frame 38 to engage the cross members 16 of the component 10. The opposite edge of the head 34 to the frame 38 has a flange 40 that lies in the plane of the head 34 with an elongate slot 41 extending upwardly from the lower edge of the head 34.

The hanger 32 is configured to facilitate transfer of component 10 from the conveyor 21 to the gantry 20. The gantry 20 can best be seen in FIGS. 1 to 3 and comprises legs 42 that support a pair of longitudinal rails 43, each extending fore and aft toward the fluidised beds 17, 19. Linear bearings 44 are provided on the upper surface of the rails 43 to support a transverse frame 45. The transverse frame 45 is moved along the bearings 44 by a layshaft 46 so the position of the transverse frame 45 can be adjusted relative to the fluidised beds 17, 19.

The transverse frame 45 has a pair of lateral rails 47 that are supported on the linear bearings 44 and are interconnected by frame members 48. Linear bearings 49 are provided on the upper surface of the lateral rails 47 to slidably support a sled 66. A drive (not shown) acts between the transverse frame and the turntable to move the sled 66 laterally relative to the fluidised beds 17, 19. The combination of the linear bearings 44, 49 and drives on the longitudinal rails 43 and lateral rails 47 allow the sled 66 to move along orthogonal axes for positioning relative to the fluidised beds 17, 19.

Figure 3:
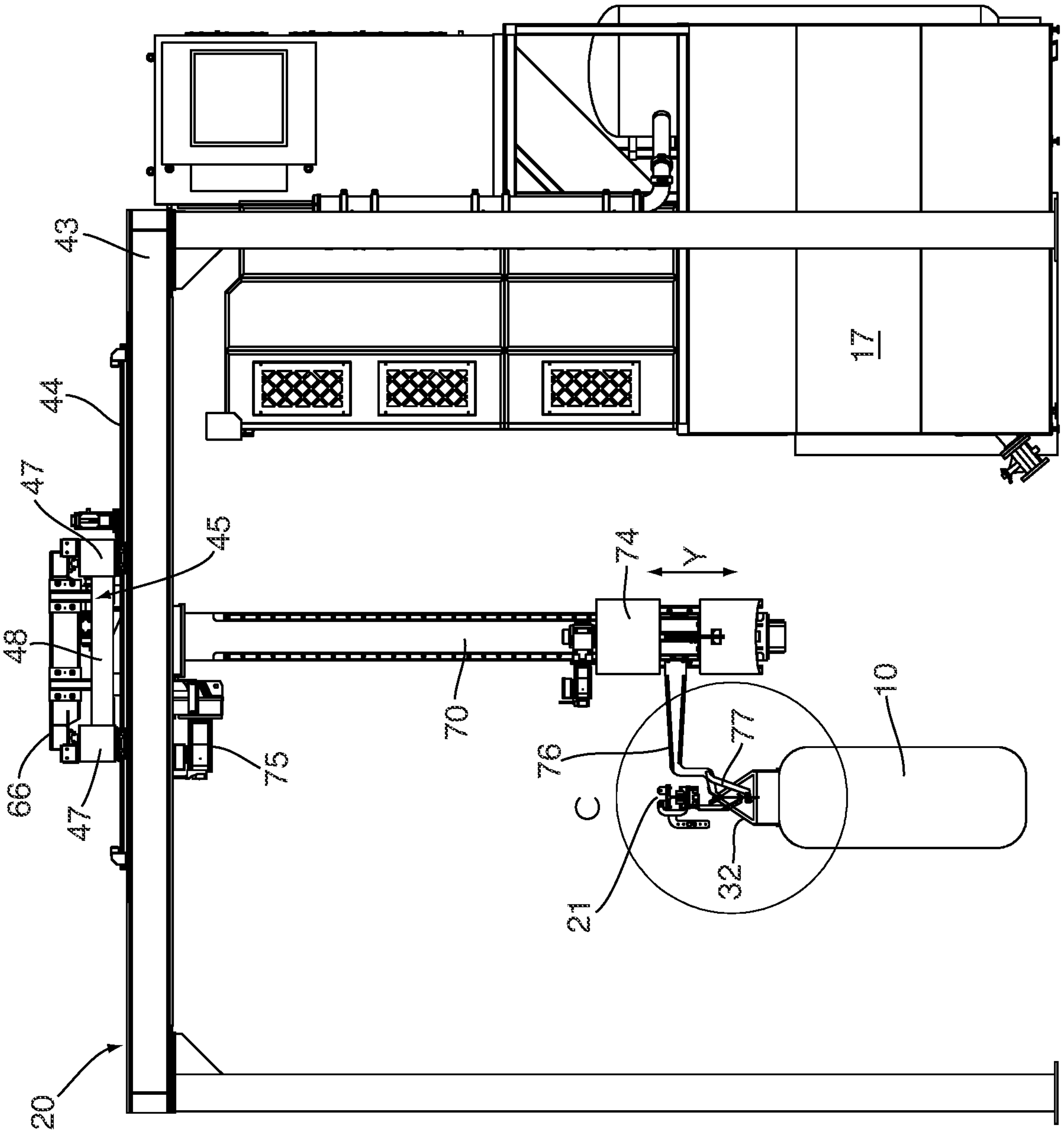
FIG. 3 is a side elevation of the transfer and coating apparatus of FIGS. 1 and 2.

A mast assembly 70 extends below the longitudinal rails 43. The mast assembly 70 supports a carriage assembly 74 for movement along the axis of the mast 70 as indicated by the arrow Y and has a hoist mechanism 75 to raise and lower the carriage assembly 74. As will be described in greater detail below, the carriage assembly 74 has a hook 76 that is rotatable about a vertical axis. The hook 76 has a distal end arranged to pass through the aperture 35 in the hanger 32 and engage the upper bar of the head 34, as shown in FIGS. 3 and 4, to lift the component 10 off the notch 30. A sway bar 77 projects downwardly from one side of the hook 76 and terminates with a pair of enlarged bosses 78. The sway bar 77 is dimensioned to fit within the slot 41, which has a flared entrance to facilitate initial alignment, with the flange 40 passing between the bosses 78.

A first embodiment of the carriage assembly 74 is described in further detail in FIGS. 6 to 10, and has a base plate 80 that can slide along the mast 70 under the control of the hoist 75. A motor 82 is mounted on the base plate 80 and drives a shaft 84. The shaft is supported in trunnion blocks 86 located at spaced intervals along the shaft 84 for rotation about a vertical axis. The lower edge of the base plate 80 is turned outwardly to provide a flange 88 that supports a thrust bearing 90 to locate the shaft 84.

A pair of arms 92 is secured to the shaft 84 adjacent to respective ones of the trunnion blocks 86. The arms 92 project away from the base plate 80 and are secured to the rear of a mounting plate 94. The mounting plate 94 has ears 96 projecting toward the base plate 80 at each corner. Operation of the motor 82 will thus induce rotation of the shaft 84 and arms 92 to swing the mounting plate, and components carried by it, about a vertical axis.

A drive plate 100 extends across the face of the mounting plate 90 and has ears 102 at each corner, generally complementary to the ears 96. The ears 102 are spaced from the ears 96 and a pair of elastomeric bushings 104 are disposed on opposite sides of the ears 96 with one of the bushings interposed between the ears 96, 102. A bolt 106 extends through the bushings and ears to secure the plates 94, 100 to one another with limited relative movement between them provided by the bushings 104.

The drive plate 100 carries upper and lower stop arms 110, 112 respectively that project outwardly from the stop drive plate 100 at the upper and lower regions of the stop drive plate 100. Each of the stop arms 110, 112 has a socket 114 formed at its outer end to receive a stop block 115.

The drive plate 100 also supports a pair of linear slide rails 116 that are oriented parallel to the shaft 84. The slide rails 116 form part of a slide assembly 117 and each of the slide rails 116 carries a pair of shoes 118 that are attached to a respective one of a pair of angle brackets 120, 122 that are part of the slide assembly 117. Each of the angle brackets

120, 122 extends across the drive plate 100 and has a pair of ears 124 projecting from the brackets 120, 122.

A shaker plate 130 is located between the ears 124 and itself has an ear 132 at each corner that is complementary to the ears 124. A pair of elastomeric bushings 134 is positioned on opposite sides of each of the ears 132 with one of the bushings interposed between the ears 124, 132. A bolt 136 extends through the bushings 134 and ears 124, 132 to secure the angle brackets 120, 122 and the shaker plate 130 to one another whilst permitting limited relative movement.

An anvil 140 is attached to the shaker plate 130 and has oppositely directed sockets 142 at opposite ends. Each of the sockets 142 is aligned with and directed toward a respective one of the sockets 114 on the stop arms 110, 112 and each carries a punch block 144 positioned to abut the facing stop block 115. Hook 76 is secured at its inner end to the anvil 140.

A pair of L-shaped cheeks 146 is attached to the anvil 140 and shaker plate 130 to extend toward the lower edge of the plate between the ears 124, 132. A U-shaped bracket 148 is positioned between the cheeks 146 and pivotally connected to them by a pin 150. The bight of the bracket 148 is connected to a piston rod of a linear air motor 152. The motor 152 has a cylinder 154 which is supported on an arm 156. The arm 156 is connected to the stop plate 100 between the ears 102. The motor 152 is supplied with compressed air through a valve so the piston rod can be extended or retracted under the control of the valve. The motor 152 may be either double acting to power both extension or retraction, or may be single acting to provide extension with the weight of the component providing the force for retraction.

To facilitate coating, the air motor 152 is pulsed to extend and retract. A pulse rate of between 0.5 and 5 pulses per second has been found satisfactory with a pulse rate of 2 pulses per second preferred. Extension of the motor 152 is transferred through the pin 150 to the anvil 140 and displaces the shaker plate 130 relative to the drive plate 100. Movement of the shaker plate 130 is accommodated by the slide assembly 117 with shoes 118 sliding on the rails 116 and continues until the punch block 144 engages the stop block 115. Continued extension of the air motor is accommodated by deflection of the elastomeric bushings 134 until the air cylinder 152 retracts and moves the shaker plate 130 downwardly. Continued downward movement causes the lower punch block 144 engages the lower stop block 115. The pulsing of the motor 152 therefore bodily displaces the hook relative to the base plate and causes the component 10 to be bodily displaced within the fluidised bed 46. This movement is independent of the movement of the carriage assembly 74 along the mast and therefore can continue as the component is raised and lowered.

The engagement of the punch blocks 144 with the opposed stop blacks 115 imparts an abrupt shock to the anvil 140 that has been found effective to induce penetration of the coating in to intricate formations on the component. The anvil 140, and accordingly the component 10 located on the hook 76, is subjected to repeated abrupt blows or shocks which ensure penetration and distribution of the coating material.

The blocks 115, 144 are located within respective sockets 114, 142 and, as shown in FIG. 10, have abutting end faces 160, 162 which may be configured to impart impulses in predetermined directions. The end faces may be flat so as to be perpendicular to the direction of movement of the anvil 140. In this configuration, the impulses are primarily vertical to cause displacement of the coating in a vertical direction. Alternatively, the end faces 160, 162 may be inclined, for example at 30° or 45° so that at impact, the impulse provides both lateral and vertical forces. As shown in FIG. 10, the end faces 160, 162 may be undercut so as to provide a "Z-shaped" end face which produces two abrupt shocks as the blocks abut and then displace to allow further movement.

The mounting of the blocks 115, 144 in the sockets 114, 142 allows their orientation to be changed by rotating the blocks about a vertical axis. Where inclined end faces are provided, the adjustment of the block in the socket allows the direction of the forces applied to the anvil to be varied and thereby optimise the coating of the component 10. With a square socket as shown, four different orientations may be obtained. It will be appreciated that the provision of the sets of elastomeric bushings 104, 134 provides the flexibility required for the movement of the anvil and also isolates the base plate 80 and motor 82 from the shocks induced by the anvil.

A second embodiment of carriage is shown in FIGS. 11 to 14 in which like reference numerals are used to denote like components with a suffix "a" added for clarity. In the embodiment of FIGS. 11 to 14, the linear actuator 152 is replaced with a rotary drive and crank mounted on the drive plate 100*a* and connected to shaker plate 130*a* to induce vertical displacement of the anvil 140*a*. A motor 200 drives a right angle gear box 202 with an output shaft 204. A connecting rod 206 is connected to the output shaft eccentric to the axis of rotation and extends to cheeks 146*a* that extend upwardly from the anvil 140.

Rotation of the shaft 204 induces the displacement of the anvil 140*a* with the blocks 115*a*, 144*a* abutting at opposite ends of the stroke. Excess movement is accommodated by the sets of elastomeric bushings as in the linear actuator described above.

Figure 15:
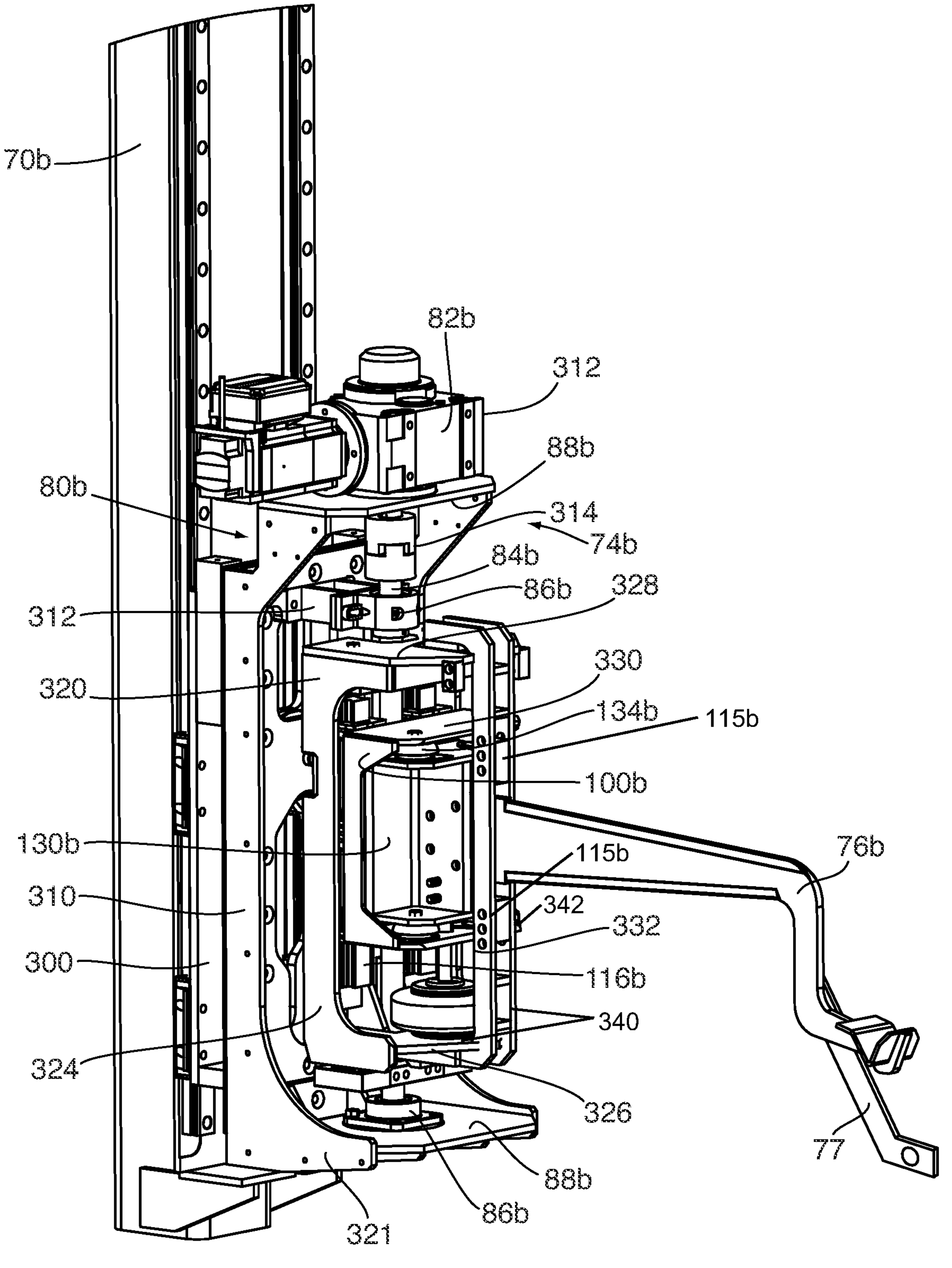
FIG. 15 is a front perspective view of a further embodiment of carriage for use in the transfer and coating apparatus of FIG. 1.
Figure 16:
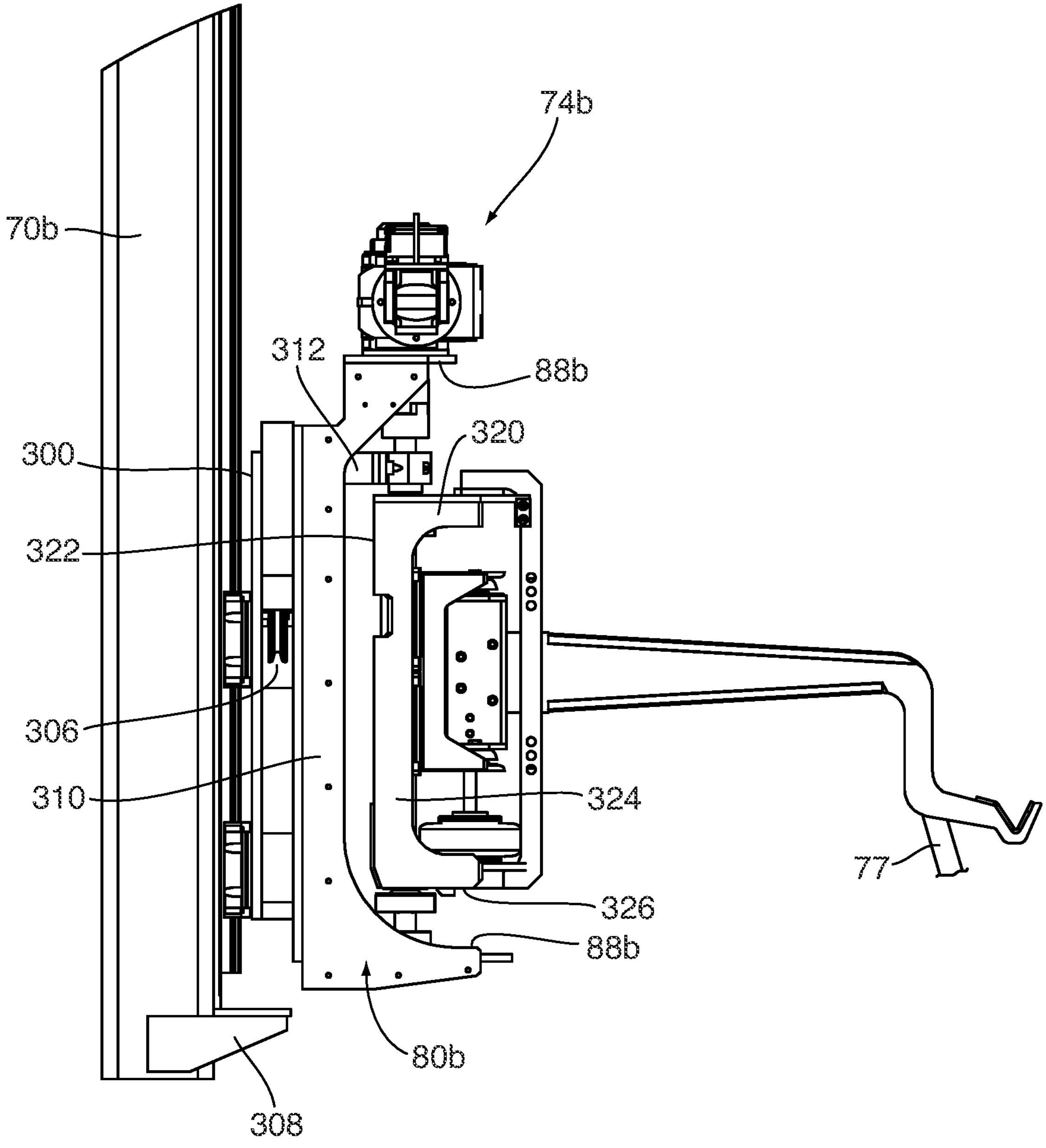
FIG. 16 is a side elevation of the carriage of FIG. 15.
Figure 17:
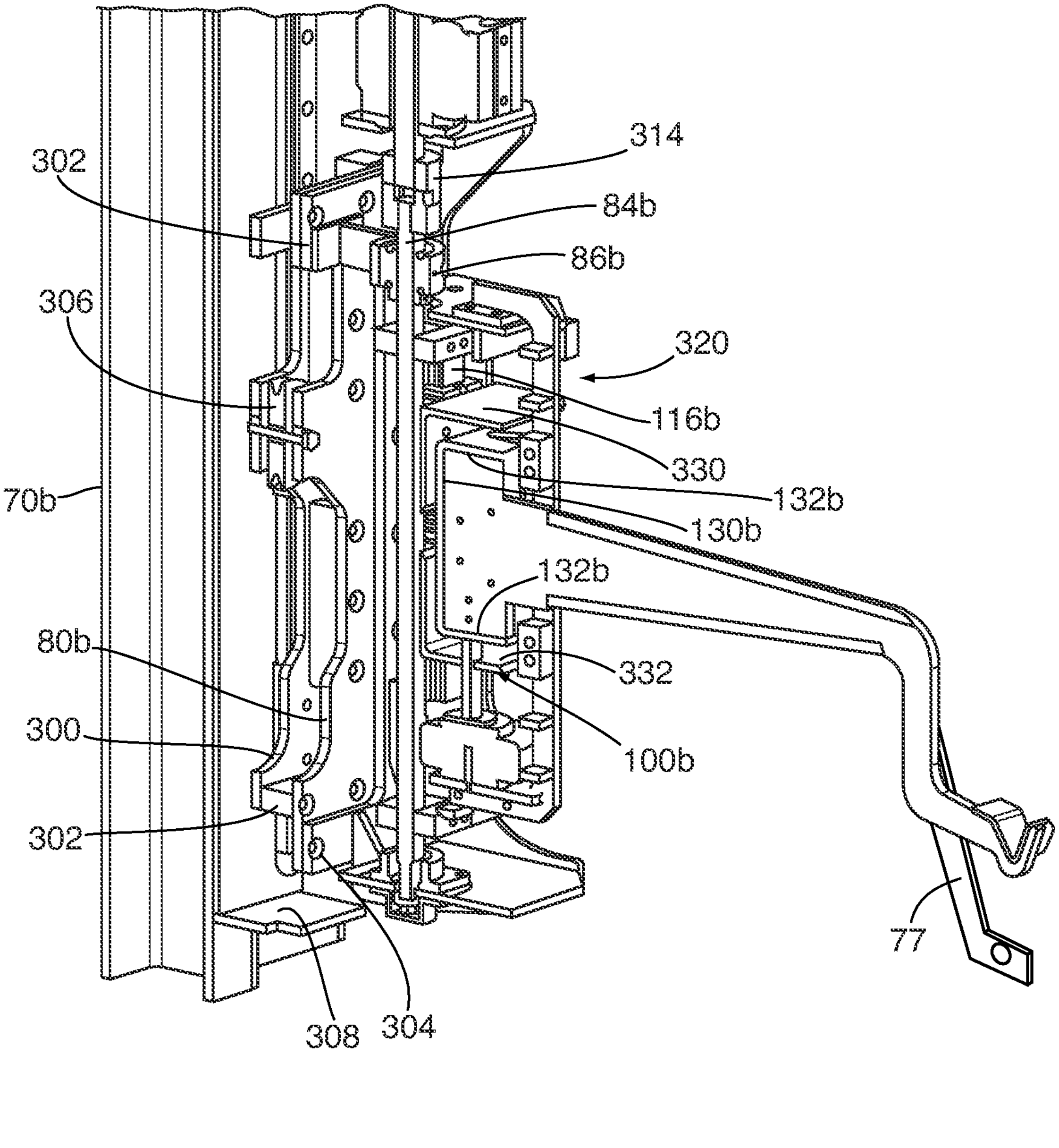
FIG. 17 is a section along the line X-X of FIG. 15.

A third embodiment of carriage is shown in FIGS. 15 to 17 where like components will be identified with like reference numerals with a suffix "b" added for clarity. In the embodiment of FIG. 15-17, the base plate 80*b* is mounted on the mast 70*b* through an attachment plate 300 to facilitate removal of the carriage assembly 74 when required. Spacers 302 are interposed between the base plate 80*b* and attachment plate 300 and mounting bolts 304 connect the plates through the spacers 304. A pulley 306 is positioned between the plates 80*b* and 300 to receive a cable of the hoist 75. A ledge 308 is secured to the lower end of the mast 70*b* to limit downward movement of the attachment plate 300.

The base plate 80*b* is formed with upper and lower flanges 88*b* and side plates 310 to strengthen the flanges 88*b*. A motor 82*b* is mounted on the upper flange 88*b* of base plate 80*b* and drives a shaft 84*b* through a right-angle drive gearbox 312 and coupling 314. The shaft 84*b* is supported in trunnion blocks 86*b*, one located adjacent the coupling 314 and one mounted on the lower flange 88*b* which also provides a thrust bearing to locate the shaft 84*b*.

The drive plate 100*b* forms part of a reciprocating drive enclosure 320 that is secured to the shaft 84*b* by mounting blocks 321 for rotation with the shaft. The enclosure 320 has a back provided by the drive plate 100*b* and sides 324, floor 326 and top 328. A slide assembly 117*b* includes slides 116*b* that are mounted on the drive plate 100*b* on either side of the shaft 84*b*. The slides 116*b* carry shoes 118*b* that are attached to a housing 120*b* that includes flanges 124*b*.

A shaker plate 130*b* has upper and lower ears 132*b* that are located between the flanges 124*b* with elastomeric bushings 134*b* are interposed between the flanges and ears. Hook 76*b* is welded to the shaker plate 130*b* between the ears 132*b* and projects outwardly between a pair of rails 340.

The rails 340 extend between the floor 326 and top 328 of the enclosure 320 and are spaced apart laterally to accommodate a pair of stop blocks **115*b*2*b*. The blocks 115*b* are secured to the rails 340 by bolts 342 that pass through one of a series of holes 344 to allow adjustment of the position of the blocks 115*b* along the rails 340**.

A pneumatic spring **152*b* is mounted on the lower mounting flange 332 of the enclosure 320 and has a piston rod 344 that is connected to the lower ears 132*b* of the shaker plate 130*b*. The piston rod 344 passes through the flange 124*b* for engagement with the lower ear 132*b* of the shaker plate 130*b* so that the spring 152*b* acts between the drive pate 100*b* and the shaker plate 130*b*. As the spring 152 is extended and retracted, it displaces the shaker plate 130*b* relative to the enclosure 320. The stroke of the spring 152*b* is slightly greater than the free movement between the blocks 115*b* and the hook 76*b* so that extension or retraction of the spring 152*b* moves the hook 76*b* into abutment with either of the blocks 115*b***.

Movement of the piston rod 344 is controlled by a pneumatic valve (not shown) that alternatively pressurises and vents the pneumatic spring **152*b*. The piston rod 344 extends under the application of pressure and retracts under the weight of the hook and component when vented to provide bodily displacement of the hook 76 relative to the enclosure 320 and base plate 80*b* and into abutment with the blocks 115*b*. Displacement of the hook 76 causes the component 10 to be bodily displaced in a vertical direction and abutment with the blocks 115*b* imparts an abrupt change of motion to the component 10. The movement of the hook 76 by the spring 152*b* is independent of the movement of the carriage assembly 74 along the mast 70*b* and therefore can continue as the component 10 is raised and lowered. The amplitude and period of the displacement is as described above with reference to the first embodiment of carriage assembly 74**.

The operation of the carriage assemblies 74, **74*a*, 74*b* will be described in detail below but it will be noted that in each embodiment, the hook may be swung about a vertical axis by rotation of the shaft 84, 84*a*, 84*b* and thereby move the component from one side of the mast 74 to the other. A swing arc of 180 degrees can be attained, allowing the component to be removed from the conveyor 21 and placed adjacent the fluidised bed 17. During the swinging of the hook 76, 76*a*, 76*b*, the transverse frame 45 and sled 66 may be moved on the gantry 20 to reduce the clearance required between the conveyor 21 and fluidised bed 17. During such movement, the carriage is moveable along the mast 70 for positioning of the component 10. Moreover, the drive to provide bodily movement, or shaking, of the hook 76 is supported on the base plate 100, 100*a*, 100*b* which in turn is rotated by the shaft 84, 84*a*, 84*b*. Therefore the hook 76 may be swung whilst the hook is being shaken to reduce cycle times in the fluidised bed 17, 19**.

Figure 18:
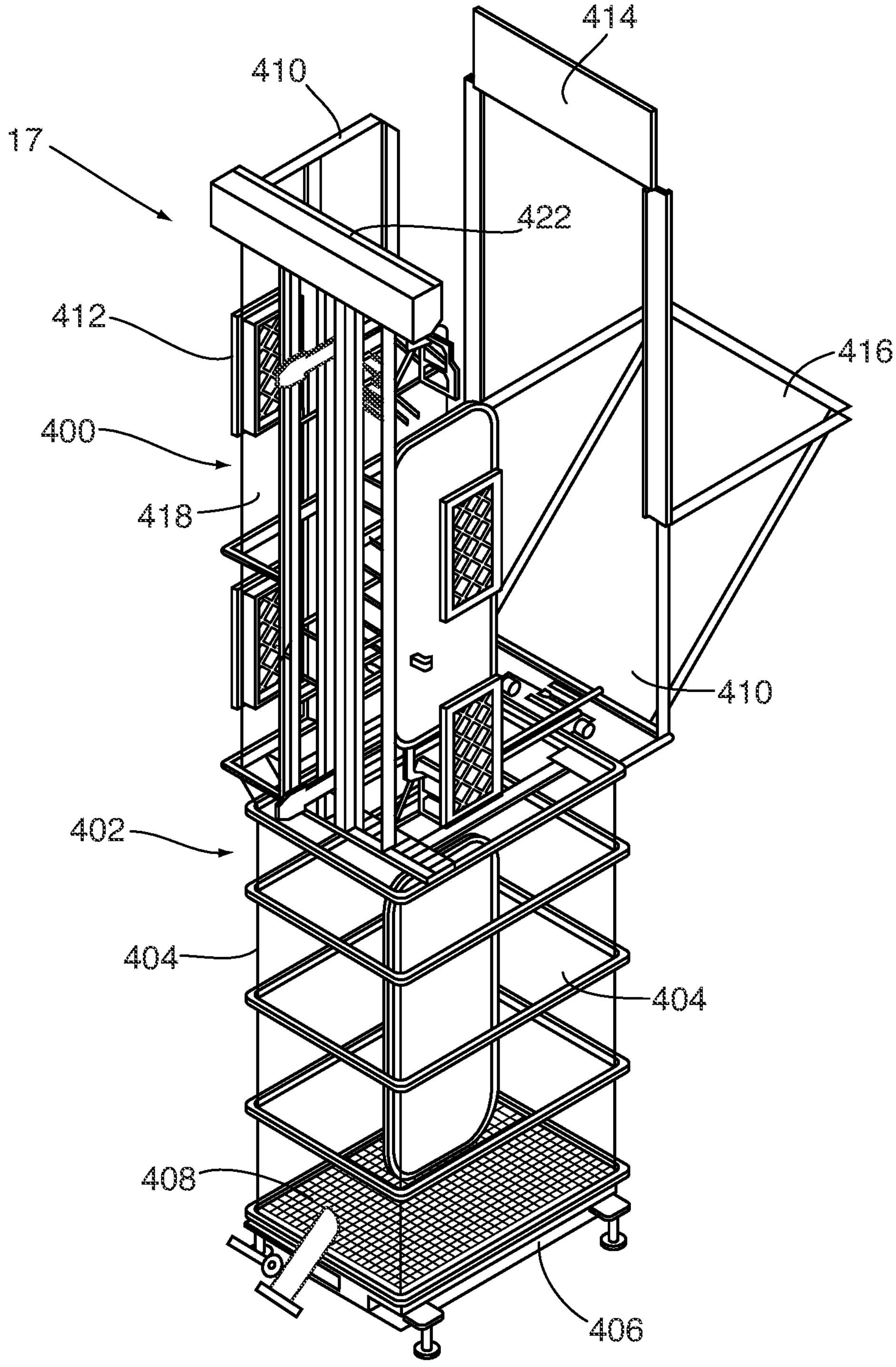
FIG. 18 is a representation of the coating station used in the transfer and coating apparatus of FIG. 1.
Figure 19:
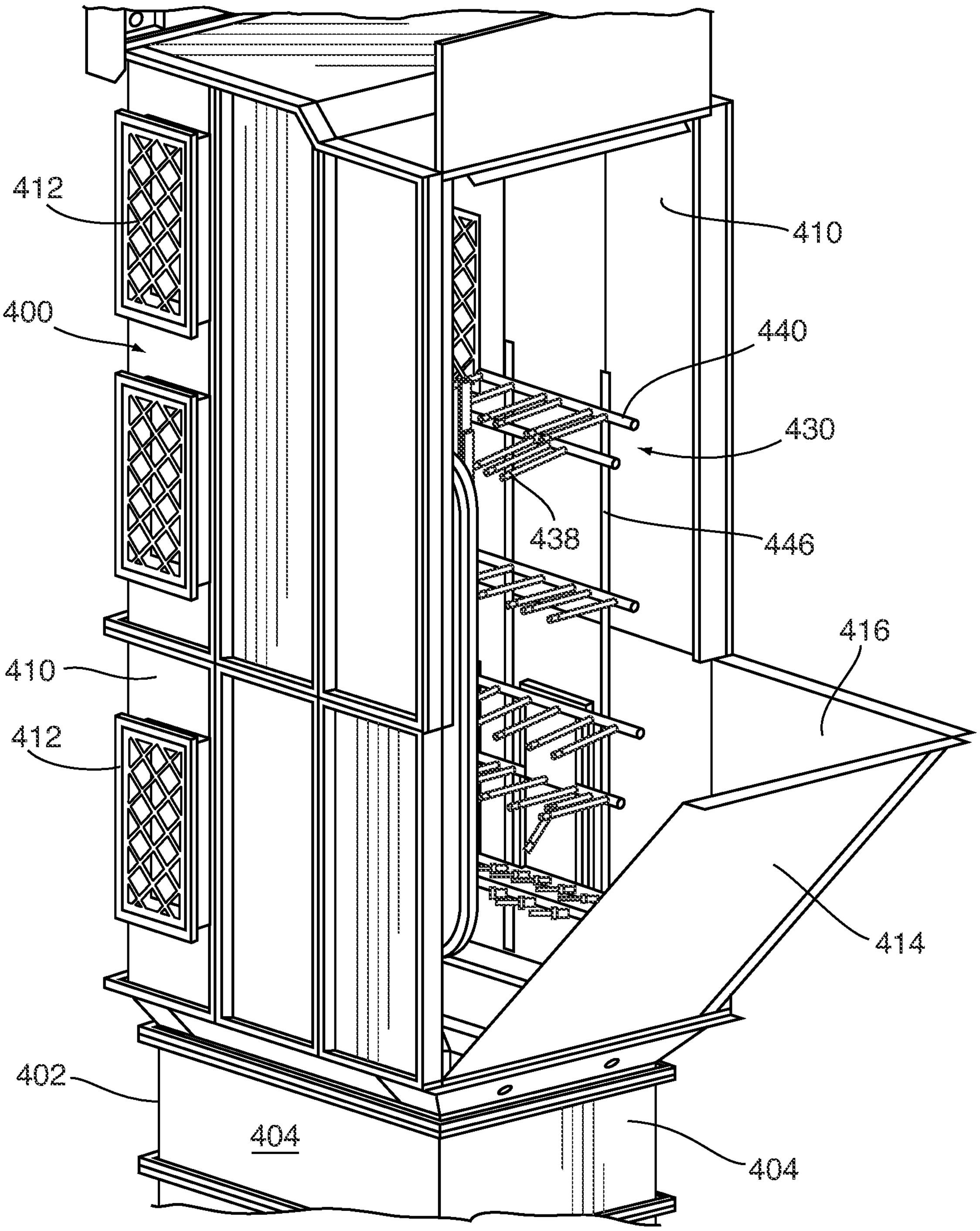
FIG. 19 is an enlarged rear view of the coating station shown in FIG. 18.

As can be seen generally in FIG. 1 and more specifically in FIG. 18, the fluidised beds 17, 19 are formed with upper and lower compartments, 400, 402 respectively. The lower compartment 402 is enclosed on all four sides by walls 404 with a floor 406 that incorporates a fluidising air inlet and coating material supply in a conventional manner. A grid 408 is spaced above the floor 406 to protect the air and material supplies during use.

Figure 20:
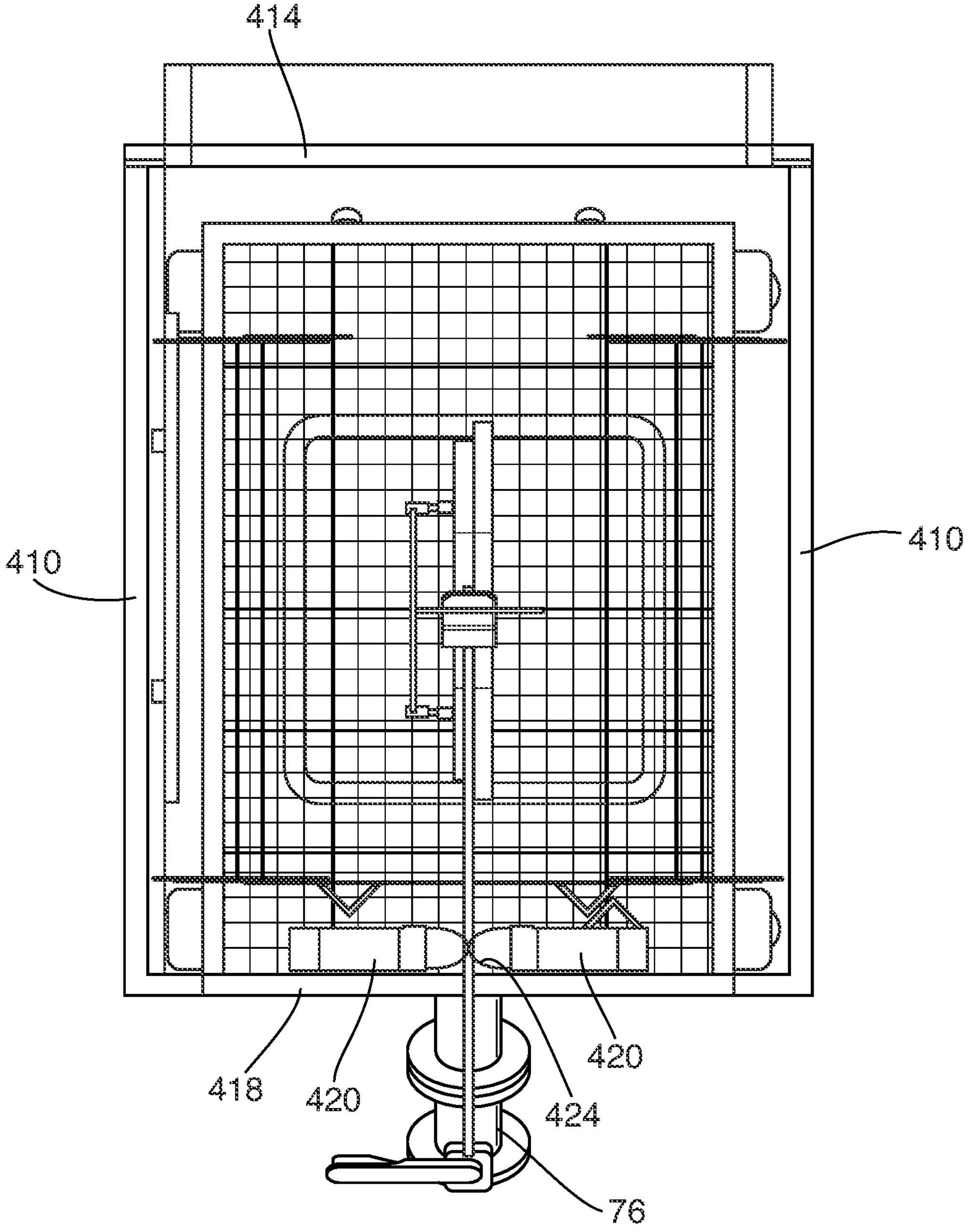
FIG. 20 is a plan view of the coating station of FIG. 18.

The upper compartment 400 is provided to hold the component 10 before and after coating has been applied and has side walls 410 with air intake filters 412 and a rear wall 414 with an air removal duct 416. The front wall 418 is formed from a pair of sliding doors 420 FIG. 20) that slide laterally under the control of an operating mechanism 422 between open and closed positions.

The doors 420 each have a flexible seal member 424 along the leading edge of the doors 420 so that the seals abut when the doors 420 are in the closed position. The seal members are hollow so that they may flex about the hook 76 when it is supporting the component 10 within the compartment 400. The flexibility of the seal members 424 also permits the hook to slide vertically between the seal members 424 whilst maintaining an effective seal as the component 10 is raised and lowered on the mast 70.

Figure 21:
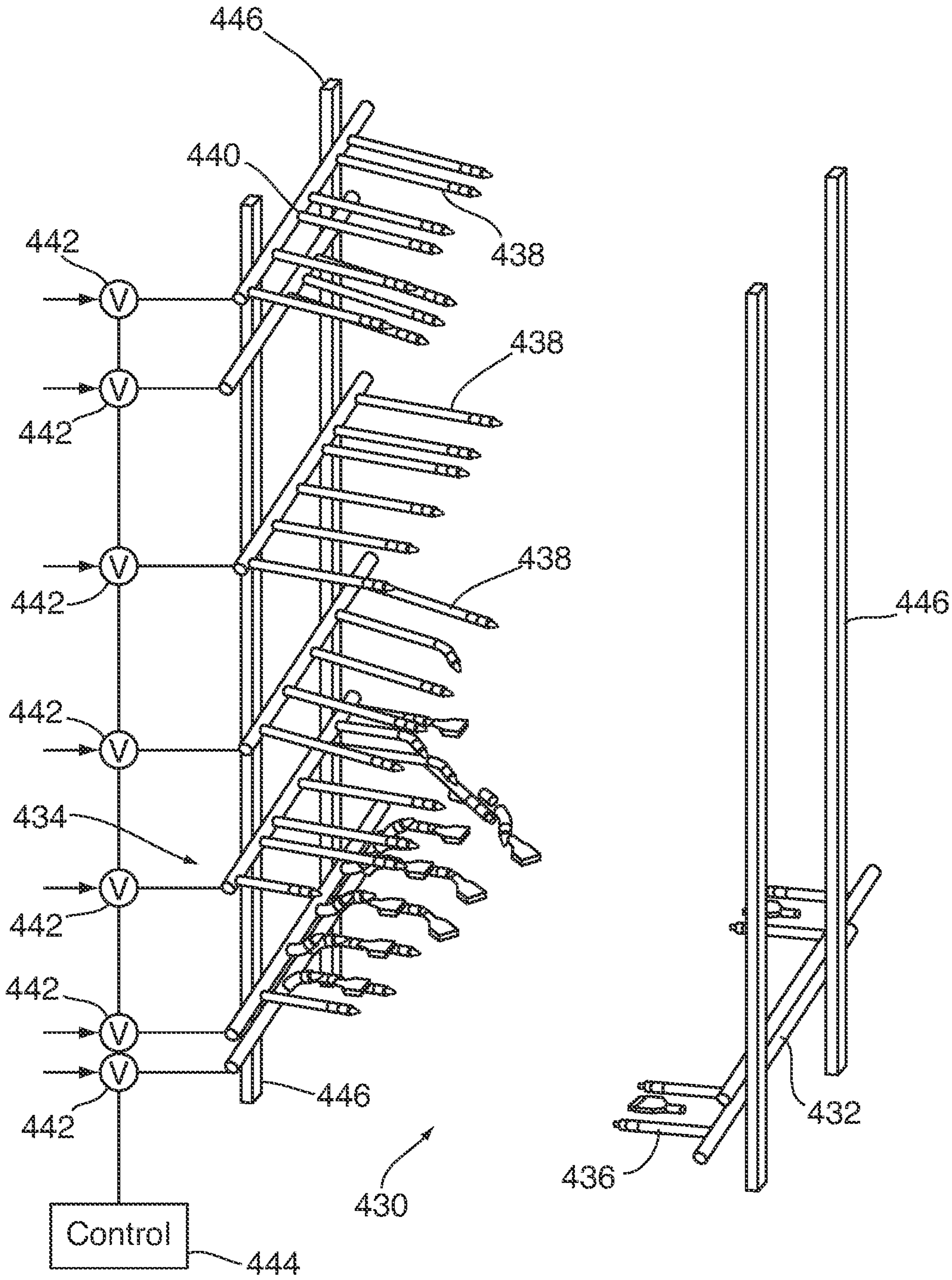
FIG. 21 is a perspective view of the components of a blow off station incorporated in to the coating station of FIG. 18.

The compartment 400 also contains a blow off apparatus 430 to remove excess material from the component 10 after coating. The blow off apparatus 430 includes a pair of arrays, 432, 434, located on respective side walls 410. The format of the arrays 432, 434 will depend on the nature of the component 10 and the intricacies of the surface of the component. As shown in FIG. 21, the array 432 is positioned on the side wall 410 that faces the planar outer surface 12 and has a single set of nozzles 436 supplied with air by a manifold 438. The array 434 is positioned to face the side of the component with the frame 15, cross members 16 and seal retainer 18 and has seven sets of nozzles 438, each placed to impinge upon an area of the component where coating is found to accumulate, such as the cross members 16. Each set of nozzles 438 is supplied by a manifold 440 that is connected to an air supply by a respective control valve 442. The control valves 442 are individually controlled by a control unit 444 to supply the nozzles 438 sequentially as the component is raised from the coating material. Again, the timing and duration of the blow off air through the nozzles 348 will depend on the nature of the component 10. The manifolds 440 are mounted on vertical supports 446 secured to the side walls 410 so the manifolds can be adjusted to suit different components.

To transfer the components 10 from the conveyor 21 to the fluidized bed 17, the component 10 is positioned on the conveyor 21 within the gantry 20. The mast assembly 70 is then positioned on the gantry 20 so that the hook 76 is located within the aperture 35. The hoist 75 is operated to move the hook 76 into engagement with the head 34 and lift the hanger 32 off the arm 28. As the hook 76 is raised, the sway bar 77 enters the slot 41 to hold the head 34 between the bosses 78 and inhibit swinging relative to the hook 76. The mast assembly 70 is then moved along the rails 43, 47 and the hook 76 rotated by the carriage assembly 74 about a vertical axis until the component 10 is aligned with the opening in the fluidized bed 17. During the repositioning, the mast assembly 70 moved relative to the gantry 20, as described above, to reduce the spacing necessary between the conveyor 21 and the fluidised beds 17, 19.

The engagement of the sway bar 77 with the head inhibits swinging of the component 10 on the hook 76 and provides for a stable transfer of the component. The sway bar is engaged as the hook is lifting the head so does not require intervention, and similarly, can be released when the component is replaced on the conveyor 21.

In the case of the first embodiment of carriage assembly 74 shown in FIGS. 6-10, the hook is swung about a vertical axis by operation of the motor 82 on the carriage assembly 74. The motor 82 is a servo motor that can be adjusted to and held in position and thereby rotate the shaft 84 to attain a desired orientation of the hook 76. Rotation of the shaft 84 is transferred through the arms 92 to move the drive plate 100 about a vertical axis. This may be done during initial lifting of the component from the notch 30, during movement along the conveyor 44 and/or during positioning within the fluid bed 46.

Similarly, in the case of the embodiment of FIGS. 11-14, the motor 82*a* rotates the shaft 84*a*, and moves the arms 92*a* to swing the hook 76. The embodiment of FIGS. 15-17 operates in a similar manner to rotate the hook 76*b* with the motor 82*b* rotating the shaft 84*b* and moving the reciprocating drive enclosure 320. The shaker plate 130*b* moves with the enclosure 320 to swing the hook 76.

The doors 420 are retracted to the open position and the transverse frame 45 advanced to place the component 10 within the upper compartment 402. The doors 420 are then closed with the seals 424 flexing around the hook 76 to contain the environment within the fluidised bed 17.

With the component positioned in the upper compartment 402, the hoist 75 is used to lower the carriage assembly 74 along the mast assembly 70 into the lower compartment 400. The flexibility of the seals 424 allows the hook 76 to slide between the seals 424 and remain under the control of the hoist 75.

As the component is lowered in to the lower compartment 400, it is immersed within the fluidised coating material for the required time before the hoist 75 is reversed and the component withdrawn. The lowering and subsequent removal of the component 10 must be done relatively quickly with the immersion in the order of 30 seconds to maintain the uniform thin coating required.

As the component 10 is immersed in the coating material, the hook 76 is shaken by operation of the motor 152, 152*a*, 152*b*. The hook 76 is bodily displaced vertically as described above and abuts the stops 110, 112 to impart rapid changes of motion or shocks to the component carried on the hook 76. The shaking of the hook 76 continues as the component is lifted from the lower compartment 400. The shaking has been found to encourage the penetration of the coating into the complex surface features of the component 10.

Movement of the component upwardly activates the blow off apparatus 430 and sequentially supplies air to the manifolds 440 and through the nozzles 434. The air flow from the nozzles removes excess coating material and can be selectively switched on and off depending on the nature of the component. The hoist 75 may also be used to raise and lower the component over relatively small excursions to assist the removal of excess material and to complement the action of the motors 152, 152*a*, 152*b* in encouraging penetration of the coating.

With the excess coating removed, the doors are opened and the gantry operated to remove the component 10. The component may be repositioned for application of a second coating in the fluidised bed 19, or returned to the conveyor 21. When the component is returned to the conveyor, the hanger 32 is positioned so the notch 30 on the arm 28 is in the aperture 35. The hoist is then lowered to release the hook from the head 34 and remove the sway arm 77 from the slot 41 and the hook retracted.

The component may then be moved along the conveyor 21 and a further component 10 positioned for coating.

It will be seen therefore that the handling and coating of the component is performed in an efficient, flexible manner that provides a uniform coating with removal of excess material in a contained environment. The component is controlled during movement between conveyor and fluidised bed to reduce the footprint required for the apparatus and minimise human intervention. It will be appreciated that the operation of the motors to effect movement of the mast in the gantry, the hoist, and the carriage assemblies is controlled by conventional programmable logic that has not been described in detail as such controls are varied and well known to attain the functionality required.

I claim:

1. A coating apparatus including a first compartment to receive a component to be coated, a second compartment below said first compartment to contain a coating material, a carriage assembly to lower said component from said first compartment to said second compartment for application of coating and to lift said component from said second compartment after application of coating, and at least one array of nozzles in said first compartment to project a fluid toward said component as it is raised from said second compartment to remove excess coating material from said component, said first compartment having vertical walls and an opening in one of said walls to allow passage of said component into and out of said first compartment, a door assembly located in said opening and having at least one door moveable between an open position in which access to said first compartment is permitted and a closed position in which access is inhibited, and a door operating mechanism to move said at least one door between said open position and said closed position.

2. The coating apparatus of claim 1 wherein said door assembly includes a pair of doors slidable laterally relative to one another between said open position in which leading edges of said doors are spaced from one another and said closed position in which leading edges of said door abut.

3. The coating apparatus according to claim 2 wherein each of said doors has a seal disposed at said leading edge.

4. The coating apparatus according to claim 3 wherein said component is carried on a hook moveable with said carriage assembly and said seals pass around said hook and permit vertical movement between said hook and said doors.

5. The coating apparatus according to claim 2 wherein said door operating mechanism is disposed above said opening.

6. The coating apparatus according to claim 1 wherein multiple arrays are located in said first compartment with at least one array on either side of said component.

7. The coating apparatus according to claim 6 wherein a plurality of said arrays of nozzles are arranged in said first compartment on at least one side of said component, said arrays of said plurality of arrays being vertically spaced from one another.

* * * * *